Feb. 22, 1938.  W. L. MARDEN  2,109,178
DISPENSING APPARATUS
Filed Nov. 29, 1935  2 Sheets-Sheet 1
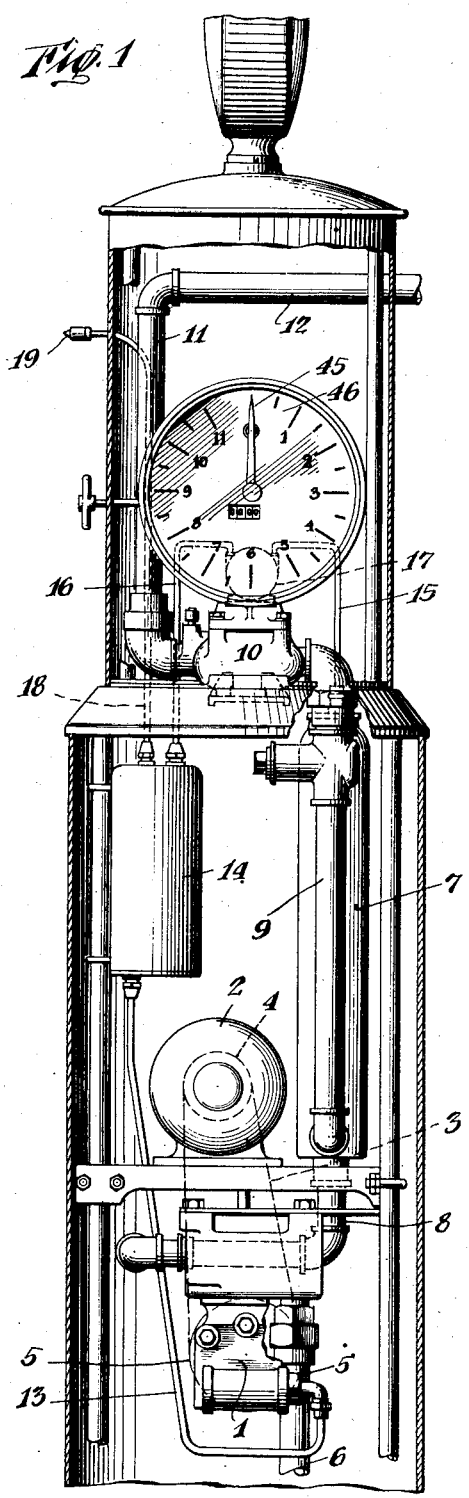
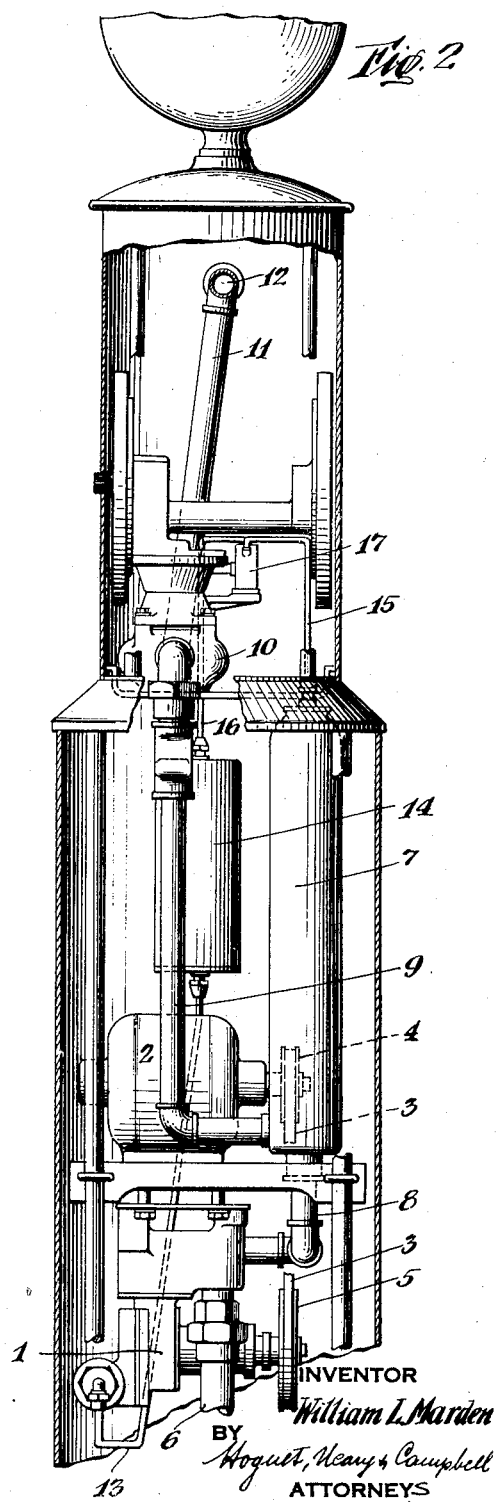
INVENTOR
William L. Marden
BY
Hoguet, Neary & Campbell
ATTORNEYS Feb. 22, 1938.  W. L. MARDEN  2,109,178
DISPENSING APPARATUS
Filed Nov. 29, 1935  2 Sheets-Sheet 2
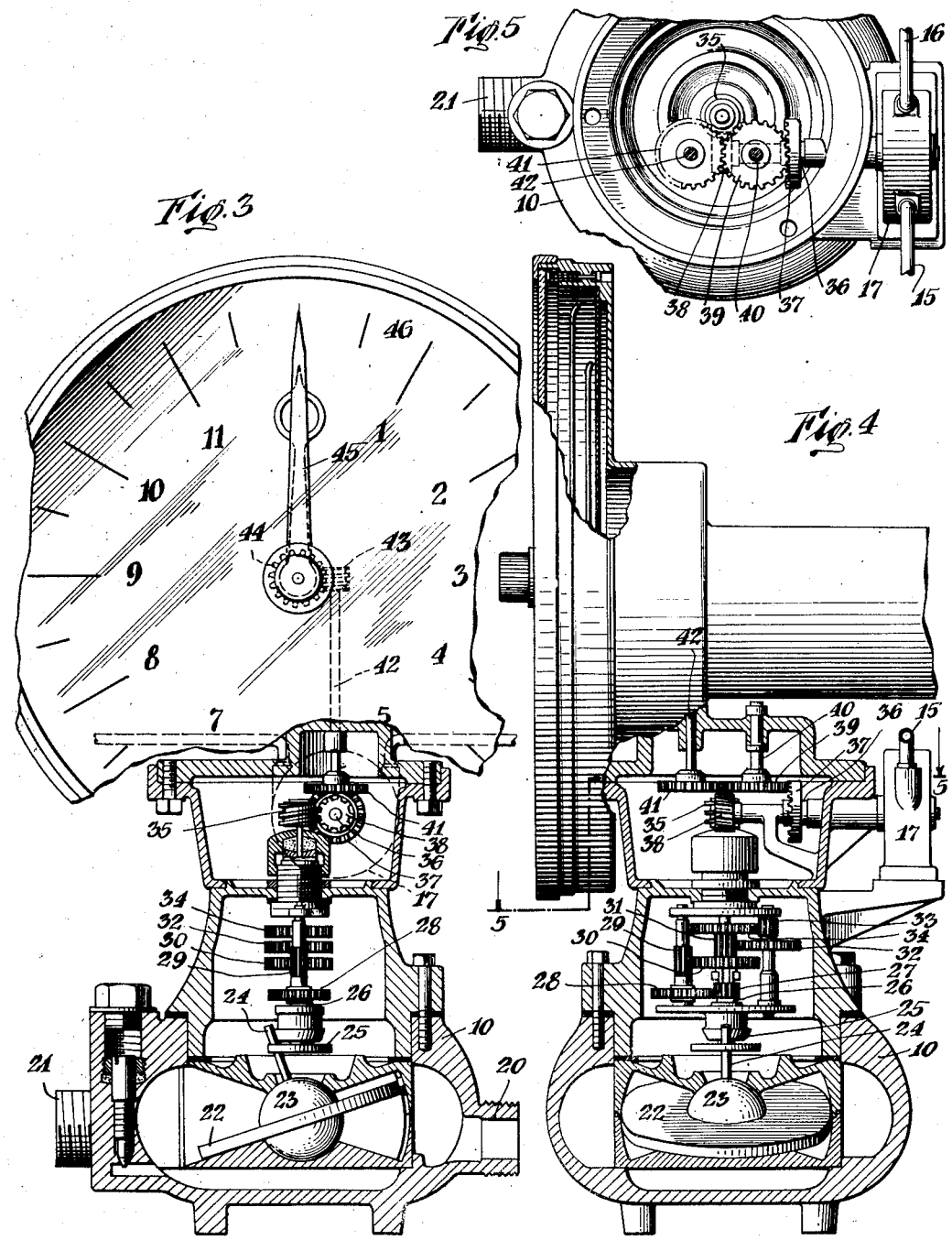
INVENTOR
William L. Marden
BY
ATTORNEYS Patented Feb. 22, 1938

2,109,178

UNITED STATES PATENT OFFICE 2,109,178

DISPENSING APPARATUS

William L. Marden, Jackson Heights, N. Y., assignor to Neptune Meter Company, a corporation of New Jersey Application November 29, 1935, Serial No. 51,980

2 Claims. (Cl. 73—232)

This invention relates to liquid metering devices and particularly to devices having registering mechanism associated therewith for indicating the amount of liquid passing the meter.

It has heretofore been appreciated that liquid meters such as those employed in dispensing pumps for gasoline filling stations may operate inaccurately when liquid is delivered relatively slowly due to the load imposed on the meter in driving the registering mechanism. This is particularly true when the registering mechanism includes computing mechanism or other means requiring appreciable power for their operation.

In order to overcome this difficulty it is desirable that some source of power other than the meter be provided for actuating the registering mechanism. However, it is necessary to prevent the power thus supplied from influencing the operation of the meter itself in order for the register and meter to accurately indicate the amount of liquid flow. Moreover, the use of slip connections or intermittently operating drives between the source of power and the register as heretofore suggested are unsatisfactory and inaccurate, especially when the liquid flow is intermittent or irregular as in the operation of a dispensing pump.

In accordance with the present invention, these difficulties are overcome and accuracy of operation is assured by providing a source of power for driving the registering mechanism which is controlled by the operation of the meter but which, by reason of the connections therebetween, is incapable of actuating the meter or influencing its operation.

In its preferred form, the register driving connections and the controlling means are positively connected to the source of power for driving the register so that danger of slippage or overrunning of the register or meter is avoided. As applied to liquid dispensing devices, the invention may conveniently include a source of power for actuating the register and mechanism which is driven only when the dispensing device is operating and a flow of liquid is established.

One of the objects of the present invention is to provide a novel form of metering device in which the registering or other mechanism is driven from a source of power other than the meter, but which is positively controlled by the meter without danger of influencing the meter operation.

Another object of the invention is to provide a novel type of gear connection between a source of power and a meter and register, which connection is capable of transmitting power to the register to operate the same and is controlled by the meter although incapable of transmitting power thereto.

A further object of the invention is to provide a novel combination of a meter and registering mechanism with the elements of a liquid dispensing device wherein power for operating the register is supplied only when the device is operating and is utilized under the control of the meter.

The exact nature of the invention is set forth with greater particularity in the following specification and appended claims and in the illustration in the accompanying drawings, in which:

Fig. 1 is a partly sectional front elevation of a form of liquid-dispensing apparatus employing my invention.

Fig. 2 is a partly sectional side elevation of the same.

Fig. 3 is a front elevation of the liquid meter shown partly in section.

Fig. 4 is a side elevation of the liquid meter shown partly in section.

Fig. 5 is a transverse section taken along line 5—5 of Fig. 4, showing the connection between the liquid-operated measuring mechanism and the hydraulically-operated drive.

Referring more particularly to the drawings, the device constituting the invention is illustrated as applied to the well known curb stand gasoline filling station. Such a station may include a gasoline pump 1 driven by a suitable motor 2 through the belt 3 and pulleys 4 and 5 for pumping gasoline from a suitable source through the inlet pipe 6 into a tank 7 through a pipe 8. From tank 7 the gasoline flows through a pipe 9 into the metering chamber 10 and outwardly through pipes 11 and 12 to the dispensing hose. Gasoline, together with certain amounts of air and vapor that may be entrained therein, is also pumped through the relatively smaller pipes 15 and 16 into the auxiliary tank 14. Separation of the air and vapor from the gasoline takes place in this chamber 14, the air and vapor passing through pipe 18 and venting from outlet 19 and the gasoline returning to the suction side of the inlet of pump 1 through pipe 13. By-pass pipes 15 and 16 extend respectively from tanks 7 and 14 to a common chamber 17, the nature and purpose of which latter will hereinafter be more fully described. Suffice it to say at this time, the by-passes above referred to constitute an air release, in that as long as the motor 2 is running, gasoline is circulating regardless of whether the dispensing valve in the hose is open or not, and the air or vapor which may have a tendency to collect in the system is thus expelled.

Now referring to Figs. 3, 4, and 5, the gasoline is pumped under pressure through pipe 9 and enters the chamber 10 through the inlet 20 passing out through the outlet 21 into the pipe 11. Chamber 10 is shown as housing the conventional nutating disc 22 with its ball 23 and spindle 24 of the liquid-operated measuring mechanism. The flow of gasoline into chamber 10 and the resulting pressure causes the disc to nutate and, as the spindle engages the element 25 carried by the rotatable shaft 26, the latter is thus rotated. Shaft 26 carries a pinion 27 engaging with a gear 28 of a train of reduction gears and pinions 29 to 34, inclusive, for imparting rotary movement to a worm 35.

The part referred to as 17 is in reality a housing for a hydraulic motor arranged in the air release line as explained. The hydraulic motor may be of any suitable type in which the flow of gasoline, air or vapor in the housing causes a rotation of a shaft 36. This shaft carries a crown gear 37 and a pinion 38. The crown gear meshes with a gear 39 carried by the shaft 40. Gear 39 meshes with a gear 41 carried by a shaft 42.

The worm 35 and pinion 38 are in constant engagement. The worm, however, is non-reversible. In other words the relationship between the teeth of the worm and pinion is such that the worm may control or limit the operation of the pinion but the pinion cannot drive the worm. The rotation of the shaft 42 carrying a worm 43 engaging a gear 44 carried by a pointer 45 causes the latter to rotate clockwise on the face of the indicating dial 46. The hydraulic motor tends to rotate shaft 36 as long as the motor 2 is in operation, whether gasoline is being dispensed through the hose or not. Any suitable type of hydraulic motor or construction may be used which permits ready flow of liquid through or around the motor when the supply of liquid exceeds that required for the motor operation. The motor preferably is constructed so that it continually tends to drive the pinion 38 and shaft 36 at a rate exceeding that permitted by the meter so that the worm 35 acts as a control element regulating the speed of operation of the motor while excess liquid is by-passed or allowed to slip through the motor. In this way a positive connection is provided for transmitting driving force from the motor to the register while a positive controlling connection is provided between the meter driven worm 35 and the motor driven pinion 38 which insures control of the motor operation but prevents the transmission of a driving force from the motor to the meter through the worm.

Moreover, the system is fool-proof in that the register driving means is interposed in the air release line, insuring efficient performance without introducing any extra otherwise unnecessary additions to the pipe line system.

The use of the nutating disc 22 in the chamber between the inlet 20 and outlet 21 for driving a train of gears to operate the pointer 45 is conventional. The essential feature of the invention is the improvement in the device for providing positive driven means controlled by the meter but utilizing an independent source of power for the drive of the pointer.

In summary, as long as the pump motor 2 is in operation the hydraulic motor 17 tends to be driven, inasmuch as the latter is in the air release line through which liquid, vapor or air flows continuously. This is true whenever the pump motor 2 is in operation, whether or not the gasoline is being dispensed through the delivery hose. The hydraulic motor 17 drives the pinion 38, while the train of gears operated by the nutating disc drives the non-reversible worm 35. Despite the fact that the worm and pinion are in constant mesh, the pinion cannot drive the worm. Thus while the hydraulic motor 17 through the crown gear 37 drives gears 39 and 41 for rotating the pointer, this drive is definitely regulated by the worm which is in mesh with the pinion. This relieves the nutating disc of the major load of driving the pointer. However, neither the speed of operation of the pointer nor the accuracy of the resulting indication is affected by the auxiliary force applied by the hydraulic motor 17.

I claim:—

1. In a liquid dispensing device, the combination comprising a meter actuated by flow of liquid in a dispensing operation, a hydraulic motor, common means for supplying liquid to said meter and motor to actuate the same, a worm driven by said meter in response to operation thereof, a pinion driven by said motor and meshing with said worm and a register driven by said motor for indicating the operation of said meter, said motor tending to drive said register at a rate exceeding the rate of operation of said meter at all rates of operation of said meter, said worm and pinion being arranged to prevent drive of the meter from said motor.

2. In a liquid dispensing device, the combination comprising a meter actuated by flow of liquid in a dispensing operation, means for supplying liquid to said meter, a motor including means actuated in response to operation of said liquid supplying means, a worm driven by said meter in response to operation thereof, a pinion driven by said motor and meshing with said worm and a register driven by said motor for indicating the operation of said meter, said motor tending to drive said register at a rate exceeding the rate of operation of said meter at all rates of operation of said meter, said worm and pinion being arranged to prevent drive of the meter from said motor.

WILLIAM L. MARDEN.